UNITED STATES PATENT OFFICE.

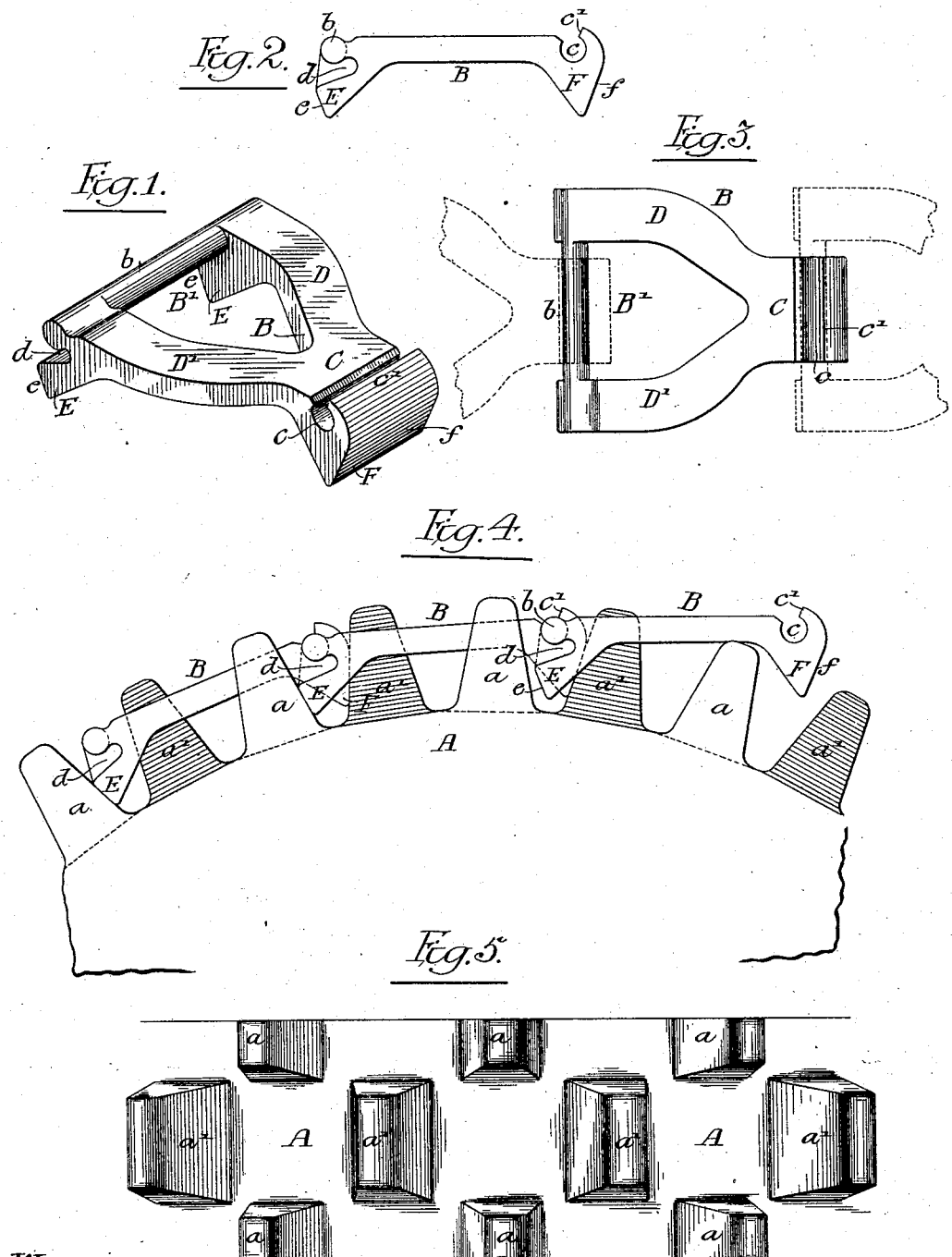

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DETACHABLE OPEN LINK FOR DRIVE-CHAINS.

SPECIFICATION forming part of Letters Patent No. 722,002, dated March 3, 1903.

Application filed December 8, 1902. Serial No. 134,386. (No model.)

*To all whom it may concern:*

Be it known that I, JAMES M. DODGE, a citizen of the United States, residing in Philadelphia, Pennsylvania, have invented certain Improvements in Detachable Open Links for Drive-Chains, of which the following is a specification.

My invention is a modification of the link shown in the application for patent filed by me on the 4th day of December, 1902, Serial No. 133,903.

The object of my invention is to make a drive-chain of the type in which the links have projecting teeth engaging the teeth of a sprocket-wheel that guide-flanges can be dispensed with and the links can be readily detached one from another. This object I attain in the following manner, reference being had to the accompanying drawings, in which—

Figure 1 is a perspective view of my improved chain-link. Fig. 2 is a side view. Fig. 3 is a plan view. Fig. 4 is a view showing a chain made up of a series of links and in engagement with the teeth of a sprocket-wheel, and Fig. 5 is a plan view of a portion of the sprocket-wheel.

B is a chain-link, preferably made in a single piece and in the form of a Y, having two side members D D' and a central extension C, the extension being of such a width that it will fit between the side members of an adjoining link. Connecting the two side members together at the outer end is a pivot-bar $b$, and in the extension C is a socket $c$, in which the pivot-bar of an adjoining link rests. The socket $c$ is open at the top for the purpose mentioned hereinafter.

Projecting from each side member D D' of the link is a tapered tooth E, and projecting from the extension C is a tapered tooth F. The flat bearing-faces of these teeth rest against the bearing-faces of the teeth $a\,a'$ of the sprocket-wheel A, as clearly shown in Fig. 4. The sprocket-wheel has three series of teeth. The outside series $a\,a$ alternate with the central series $a'$, as shown in Fig. 5. The bearing-faces $e$ of the teeth E of the links aline with the bearing-faces of the sprocket-teeth $a\,a$, while the bearing-faces $f$ of the teeth F of the links aline with the bearing-faces of the sprocket-teeth $a'$, as shown in Fig. 4. The sprocket-teeth $a'$ project through the openings B' in the links formed by the two side members D D'. Thus while a good bearing is gained the chain is also kept in alinement without the use of guard-flanges usually employed in this class of drive-chains.

In order to make the links detachable, I form a recess $d$ on the side member D' between the pivot-pin $b$ and the tooth E, so as to allow for the passage of the lip $c'$, which forms the socket $c$ on the extension C. To couple the links together, all that is necessary is to turn one link at an angle in respect to the other until the recess $d$ is in line with the lip $c'$ and then move one laterally in respect to the other, when the socket will slip over the pivot-bar $b$, and by turning the links so that they will be in line they will be locked together and cannot be moved laterally.

All that is necessary to detach one link from another is to turn it to the proper angle and move it laterally.

I claim as my invention—

1. The combination in a chain-and-sprocket driving-gear, of a sprocket-wheel having three series of teeth, and a series of enchained links having teeth at each end engaging the said teeth of the sprocket-wheel, the links being open at the center for the reception of the central series of teeth of the sprocket-wheel, substantially as described.

2. The combination in a chain-and-sprocket driving-gear, of a sprocket-wheel having three series of teeth and a chain consisting of coupled links, each link having side members and a central extension, teeth on the side members and on the extension, a cross-bar extending from one side member to the other, a socket in the extension arranged to receive the bar of an adjoining link, substantially as described.

3. The combination of a sprocket-wheel having a series of side teeth and a series of central teeth, the teeth of the central series alternating with the teeth of the side series, with a chain made up of a series of links, each link having side members and a central extension, a pivot-bar extending from one side member to the other, a socket on the extension arranged to receive the pivot-bar of an adjoining link, the outer teeth of the sprocket-wheel being in line with the teeth of the side members of the links, while the central teeth are in line with the teeth of the extensions, substantially as described.

4. The combination of a sprocket-wheel having a series of teeth at each side and a central series of teeth alternating with the teeth of the side series, a chain made up of links having toothed side members and a toothed central member, a pivot-bar extending from one side member to the other, a socket in the central extension to receive the pivot-bar of an adjoining tooth, one of the side members being recessed between its tooth and the pivot so that the links can be detached by moving them laterally, the space between the side members being sufficient to allow for the reception of a sprocket-wheel tooth to be engaged by the tooth of the central extension of an adjoining link, substantially as described.

In testimony whereof I have signed my name to this specification in the presence of two subscribing witnesses.

JAMES M. DODGE.

Witnesses:
  WILL. A. BARR,
  JOS. H. KLEIN.